United States Patent [19]

Herzog

[11] Patent Number: 5,522,543
[45] Date of Patent: Jun. 4, 1996

[54] WATER TRUCK WITH EXHAUST GAS PRESSURIZATION SYSTEM

[75] Inventor: William E. Herzog, St. Joseph, Mo.

[73] Assignee: Herzog Contracting Corporation, St. Joseph, Mo.

[21] Appl. No.: 314,632

[22] Filed: Sep. 29, 1994

[51] Int. Cl.[6] .................. B05B 9/04; B05B 1/20; F16K 21/04
[52] U.S. Cl. .............. 239/1; 239/163; 239/168; 239/170; 239/129; 137/527.8
[58] Field of Search ................... 239/146, 159, 239/161, 163, 167–169, 170, 172, 129; 222/394, 608; 137/527.8

[56] References Cited

U.S. PATENT DOCUMENTS

| | | | |
|---|---|---|---|
| 1,204,316 | 11/1916 | Renner | 137/527.8 |
| 1,623,778 | 4/1927 | Cooke | 239/163 |
| 1,888,072 | 11/1932 | Cederstrom | 239/168 |
| 1,897,165 | 2/1933 | Endacott et al. | 239/129 |
| 3,017,121 | 1/1962 | Carlson . | |
| 3,140,574 | 7/1964 | Brown, Jr. | 239/129 |
| 3,163,880 | 1/1965 | Johnson . | |
| 3,215,315 | 11/1965 | Graeber, Jr. et al. . | |
| 3,425,407 | 2/1969 | Furman et al. | 239/129 |
| 4,215,716 | 8/1980 | Klenk et al. | 137/527.8 |
| 4,512,515 | 4/1985 | Tenney . | |
| 4,940,082 | 7/1990 | Roden . | |
| 4,978,068 | 12/1990 | Eldridge . | |
| 5,009,547 | 4/1991 | Clark | 239/129 |

FOREIGN PATENT DOCUMENTS 79616  7/1955  Denmark ................ 239/129

*Primary Examiner*—Karen B. Merritt
*Attorney, Agent, or Firm*—Litman, McMahon and Brown

[57] ABSTRACT

A pressurization system for a tank on a water truck includes a pipe connected at one end via a remotely controllable three-way valve directly into the engine exhaust system of the truck and at the other end into a top portion of the water tank. Engine exhaust is thus selectively introduced into the water tank to pressurize the tank. The tank includes a top-mounted fill opening with an internal, counter-weighted flapper valve. With the internal flapper valve, the truck can be driven beneath a high volume water source and water from the source, when it hits the counter-weighted flapper valve, opens the valve by urging the flapper against the action of the counter-weight, but the flapper valve is once again closed by action of the counter-weight when water flow ceases. An anti-siphon orifice in a water outlet conduit serves to prevent water from freezing in the outlet conduit once pressurization is stopped.

21 Claims, 1 Drawing Sheet

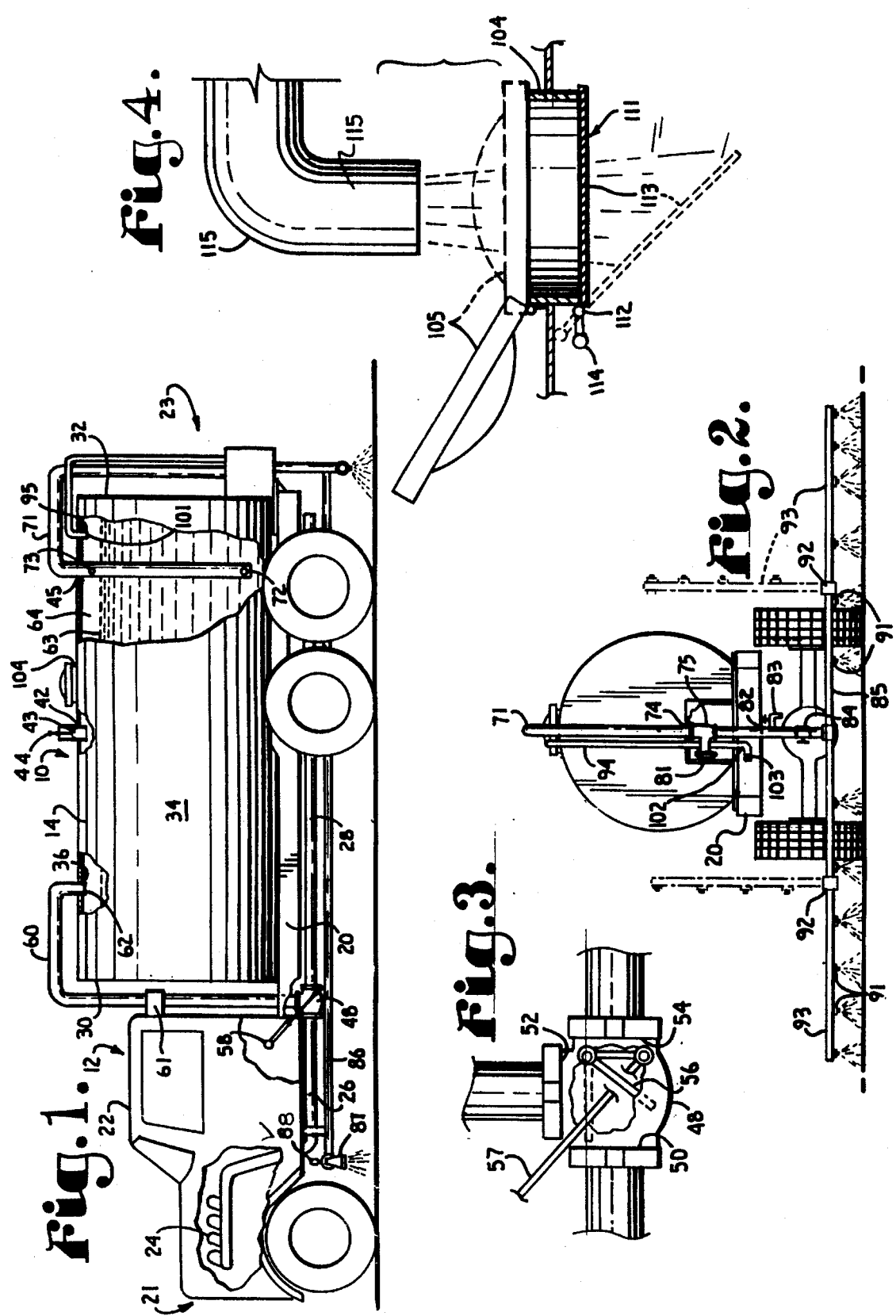

WATER TRUCK WITH EXHAUST GAS PRESSURIZATION SYSTEM

BACKGROUND OF THE INVENTION

1. Field of the Invention

The present invention relates to a pressurization system for pressurizing a liquid holding tank on a truck such as a water truck of the type generally used to clean and/or keep road surfaces damp to minimize dust in construction operations and the like. Such trucks can also be used as a source of water under pressure for fire fighting, etc. More particularly, the present invention relates to such a truck with a chassis mounted water tank which is pressurized via the engine exhaust of the truck.

2. Description of the Related Art

Trucks which carry water tanks for spraying water on road surfaces and the like are well known. Many such trucks simply employ a bottom mounted discharge with a gravity feed system for emptying the tanks. However, in order for the water to be used for cleaning road surfaces, fighting fires, or simply pumping water to a higher elevation, such water trucks must employ a pressurization system for the water tank.

Heretofore, many water trucks employed discharge systems with positive-displacement pumps fluidically communicating with their water tanks for discharging the contents thereof under pressure. Such a water discharge pump can be driven by a respective vehicle engine through a power take-off (PTO) unit. Alternatively, a "pony" motor, comprising a suitable internal combustion engine, can be mounted on the vehicle for operating the water pump or pumps independently of the vehicle's engine.

A significant problem with previous water trucks relates to problems associated with freezing of the water contents. Positive displacement pumps, such as those used with previous water trucks, may be particularly susceptible to damage caused by the freezing of water left therein. Such freeze-damage to a water pump can cause downtime for the water truck and necessitate the repair or replacement of the damaged water pump at considerable expense, particularly since these types of pumps can be relatively expensive and/or time consuming to repair or replace. Moreover, if delays are encountered in obtaining a replacement pump or parts therefor, the downtime for the water truck can substantially increase.

Protecting previous water trucks from freeze damage often involved blowing out their water systems with pressurized air, draining their contents with appropriate petcocks, etc. Previous water trucks with pumps driven by PTO's and pony motors thus tended to be relatively complex and required time-consuming winterization procedures for protection when subjected to temperatures below freezing.

Another disadvantage with a PTO-driven pump is that its output is dependent upon the speed of the vehicle engine. The optimum engine speed for a PTO-driven pump can be at or near idle, but operating the vehicle over various road conditions in different gears can cause wide fluctuations in pump output with resulting uneven water distribution.

Still further, PTO drive systems and pony engines can add considerably to both the initial cost and the ongoing maintenance expenses associated with a water truck. Such previous trucks and their water distribution systems also tended to have a number of moving parts, which were susceptible to damage and wear from freezing and other causes.

It is therefore preferable to provide a water distribution system wherein the water tank is pressurized as needed with relatively few moving parts and with a relatively simple freeze protection system. Moreover, it is preferable to provide a water distribution system which can operate at engine idle speed yet provide reliable pressurization for attaining operating pressures of up to 35 PSI, and to provide such a system which can accommodate various water application procedures such as dust control, fire fighting, etc.

Heretofore there has not been available a water truck with a pressurized discharge system having the advantages and features of the present invention.

SUMMARY OF THE INVENTION

The present invention is directed to a pressurization system for a tank on a water truck. The pressurization system includes a pipe connected at one end via a three-way valve directly into the engine exhaust system of the truck and at the other end into a top portion of the water tank. Engine exhaust is thus selectively introduced into the water tank to pressurize the tank. With the inventive system, pressures within the tank of 35 PSI or greater are readily achievable, and the tank can be pressurized even with the engine running at idle speed. The three-way valve is remotely controllable from the truck cab so that engine exhaust can be selectively by-passed from the tank to a muffler and/or other standard exhaust components.

The tank includes a top-mounted fill opening with a hinged cap and an internal, counter-weighted flapper valve. Once the hinged cap is opened, the truck can be driven beneath a high volume water source and water from the source, when it hits the counter-weighted flapper valve, opens the valve by urging the flapper against the action of the counter-weight. Once the flow of fill water is stopped, the flapper is once again closed by action of the counter-weight, all without requiring the driver to leave the truck cab. A pressure limiting valve is through-fitted through the top of the tank and an anti-siphon orifice in a water outlet conduit serves to prevent water from freezing in the outlet conduit once pressurization is stopped.

OBJECTS AND ADVANTAGES OF THE INVENTION

Objects and advantages of the present invention include: providing an improved pressurization system for a tank on a water truck; providing such a pressurization system which uses engine exhaust gas from the truck engine to pressurize the tank; to provide such a system in which a three-way valve controllable from the truck cab allows exhaust gas to be selectively introduced into the tank, or, alternatively, to be diverted to a standard exhaust system; to provide such a system in which the tank has an improved top-mounted fill flapper valve; to provide such a system in which the tank has an anti-siphon feature to prevent water from being siphoned into and possibly freezing in an liquid outlet pipe; to provide such a system with a spray boom for spreading water evenly across a road surface and with front-mounted sprayers which are directed towards a roadside curb for washing the curb; to provide such a system which can be used for either road cleaning and dust prevention, or alternatively, for fire fighting or other relatively high pressure water applications; to provide such a system with relatively few moving parts; to provide such a system which does not require a positive displacement pump; to provide such a system with a relatively simple, effective and efficient arrangement for protection against damage from water freezing therein; to provide such a system which does not require either a power take-off from the vehicle engine or a pony motor; and to provide such a system which is reliable and inexpensive, capable of operation even when the truck engine is at idle speed, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a side elevational view of the water truck with potions of the tank sidewall broken away to illustrate the interior thereof, the pressure relief valve and gas inlet, and portions of the cab broken away to illustrate the valve control and engine.

FIG. 2 is a rear elevational view of the water truck with rear spray bar end sections in a spray position in solid lines and in an up, travel position in dotted lines.

FIG. 3 is a greatly enlarged, fragmentary view of a portion of the exhaust pipe and tail pipe with a three way valve partially broken away to illustrate the interior thereof.

FIG. 4 is a greatly enlarged, fragmentary view of a liquid fill inlet on the tank with a hinged cap shown open in solid lines and closed in dotted lines, and with a counter-weighted flapper valve shown closed in solid lines and open in dotted lines.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "up", "down", "right" and "left" will refer to directions in the drawings to which reference is made. The words "inward" and "outward" will refer to directions toward and away from, respectively, the geometric center of the embodiment being described and designated parts thereof. Said terminology will include the words specifically mentioned, derivatives thereof and words of a similar import.

Referring to the drawings in more detail, a water truck with an exhaust gas pressurization system is generally designated by the reference numeral 10, and generally comprises a truck 12 with a tank 14 mounted on the truck 12.

II. Truck 12

The truck 12 includes a chassis 20 mounting a cab 22 and the tank 14, front and rear ends 21, 23, and an internal combustion engine 24.

An exhaust pipe 26 extends from the engine 24 generally below the tank 14 and terminates at a tailpipe 28.

III. Tank 14

The tank 14 includes a first or front end 30, a second or rear end 32 and a sidewall 34 which collectively form a generally cylindrical configuration. A pressurized gas inlet opening 36 is formed in an upper portion of the sidewall 34 in proximity to the front end 30.

A pressurized gas outlet opening 42 with an adjustable pressure relief valve 43 and adjustment screw 44 and a liquid outlet opening 45 are formed in the upper portion of the tank sidewall 34 in spaced relation from a liquid inlet opening 111 and with the liquid outlet opening 45 positioned in proximity to the tank rear end 32.

IV. Pressurization System

A diverter valve 48 with the general configuration of a T-valve having an inlet 50, a pressure outlet 52 and an exhaust outlet 54 is serially interposed in the exhaust pipe 26 in fluidic connection therewith, with the inlet 50 leading to the engine 24 and the exhaust outlet 54 leading to the tail pipe 28. The diverter valve 48 includes a valve member or flap 56 movable between a first or pressure position communicating the inlet 50 with the pressure outlet 52 (solid lines in FIG. 3) and a second or exhaust position communicating the inlet 50 and the exhaust outlet (broken lines in FIG. 3), as well as a plurality of intermediate positions dividing portions of the exhaust gas stream between the pressure and exhaust outlets 52 and 54 respectively. A diverter valve control cable 57 is mechanically connected to the valve member or flap 56 and extends to a knob 58 located in the cab 22 for operation of the diverter valve 48 by an operator or driver from within the cab 22.

The pressure outlet 52 leads to a pressure pipe 60 which is braced to the cab 22 via a support bracket 61 and which extends through the pressure inlet opening 36 and into the tank 14 with an open end 62 extending into the tank. When the flap 56 is in the pressure position, exhaust gas is directed through the pipe 60 and into the tank 14, which contains a volume of liquid 63, usually water. Exhaust gas from the engine 24 is thus introduced, under pressure from the engine pistons, into a gas pocket 64 above the level of the liquid 63. The exhaust gas thus pressurizes the tank 14, with available pressure levels from 5 to 35 PSI, depending upon the level of liquid 63 in the tank, the speed of the engine 24 and the position of the flap 56.

Referring to FIGS. 1 and 2, a liquid outlet pipe 71 extends through the liquid outlet opening 45 in the top of the tank 14, the pipe 71 having a first, open end 72 which reaches to a level proximate the bottom of the tank 14. An orifice 73 extends through the side of the pipe 71 inside of but near the top of the tank 14. The orifice 73 performs an anti-siphon function to prevent water from being siphoned into the pipe 71 in a position to freeze during cold weather. The pipe 71 has a second end 74 which enters a T fitting 75. A fire hose attachment 81 leads from one side of the fitting 75 and a spray bar supply pipe 82 leads from the bottom of the fitting 75. A standard water tap 83 is connected to the spray bar supply pipe 82 above a shut-off valve 84 in the pipe 82. The shut-off valve 84 controls the flow of liquid to a spray bar center portion 85. An additional supply pipe 86 extends from the spray bar supply pipe 82 forward to a pair of front mounted spray slots 87, each with its own valve 88 (FIG. 1). The spray slots 87 are directed toward the side of the truck 12, for washing curbs or the like.

The spray bar center portion 85 has a plurality of spray heads 91 positioned along the bottom thereof. The center portion 85 terminates in a pair of hinges 92 with each hinge 92 fluidically connecting the center portion 85 with one of a pair of spray bar end portions 93. The end portions 93 are thus pivotable between a down, spray position (shown in solid lines in FIG. 2) and an up or travel position (shown in dotted lines in FIG. 2). Each spray bar end portion 93 also includes a plurality of spray heads 91 extending along the bottom thereof. A fill tube 94 extends through a fill opening 95 in the tank 14, with a first, open end 101 extending downward into the tank 14 and a second end 102 with a threaded coupling 103 extending out of and downward from the tank 14 such that the tank 14 can be filled from a low-lying water source such as a fire hydrant or the like.

Referring to FIG. 4, a fill opening sleeve 104 extends through the top portion of the tank 14 with a hinged cap 105 pivotally attached thereto for covering an opening 111 in the sleeve 104. The cap 105 is shown in an open position in solid lines and in a closed position in dotted lines. The sleeve 104 is larger than a standard fill inlet, preferably being 18 inches or more in diameter. Pivotally attached to the bottom of the sleeve 104 via a hinge 112, and covering the bottom of the opening 111, is a flapper valve 113. A counter-weight 114 is connected to the flapper valve 113 and extends outward from the hinge 112. The counter-weight 114 is heavy enough to counter the weight of the flapper cover 113 and normally urges the cover upward to a sealing engagement with the sleeve 104 (as shown in solid lines in FIG. 4).

In order for a driver to fill the tank 14 from an elevated water source, such as a water tower (not shown), the truck 12 is driven beneath the water source to a position at which a supply outlet 115 is suspended above the top of the sleeve 104 and over the opening 111. The driver then simply starts the flow of water through the supply outlet by pulling a cord or the like and the weight of water from the supply outlet 115 urges the flapper valve 113 downward, thus allowing water to enter the tank 14. Once the flow of water is cut off, the flapper valve 113 automatically pivots upward due to the action of the counterweight 114, thus sealing off the opening 111 and allowing the tank 14 to be pressurized. With the inventive counter-weighted flapper valve 113, a driver can fill the pressurized tank 14 from an elevated water source without having to climb on top of the tank 14 to open the cover 105, which can be locked to a normally open position, and even without leaving the cab 22.

It is to be understood that while certain forms of the present invention have been illustrated and described herein, it is not to be limited to the specific forms or arrangement of parts described and shown.

What is claimed and desired to be secured by Letters Patent is as follows:

1. A pressurized liquid supply system, comprising:
   (a) a truck driven by an internal combustion engine, said engine including an exhaust gas outlet;
   (b) a tank mounted on said truck, said tank including a tank interior;
   (c) gas pressure communicating means fluidically connecting said exhaust gas outlet to a gas pressure inlet in said tank, said gas pressure inlet communicating directly with said tank interior;
   (d) a liquid inlet opening in said tank communicating directly with said tank interior;
   (e) a liquid outlet opening in said tank communicating directly with said tank interior, said liquid outlet opening being positioned in a top portion of said tank;
   (f) outlet valve means fluidically communicating with said tank outlet opening;
   (g) liquid dispensing means fluidically connected to said outlet valve means; and
   (h) a pipe extending through said liquid outlet opening in said tank, said pipe extending into said tank and with an open end located proximate a bottom surface of said tank and a second end connecting with said outlet valve means.

2. The invention of claim 1 wherein:
   (a) said gas pressure communicating means includes a diverter valve which connects said exhaust gas outlet with said tank in a first position and diverts said exhaust gas from said tank in a second position.

3. The invention of claim 2 wherein:
   (a) said diverter valve comprises a three-way valve with an inlet fluidically connected to said exhaust gas outlet, a pressure outlet fluidically connected to said tank gas pressure inlet and an exhaust outlet fluidically connected to an exhaust gas discharge, said diverter valve communicating said inlet and said pressure outlet in its first position and communicating said inlet and said exhaust outlet in its second position.

4. The invention of claim 2 and further comprising a pressure regulator means for maintaining a predetermined gas pressure in said tank.

5. The invention of claim 2, wherein said liquid inlet opening includes:
   (a) a check valve positioned within said tank for admitting liquid to said tank but for blocking pressurized gas discharge therefrom through said liquid inlet opening when no liquid is being admitted.

6. The invention of claim 5 wherein said check valve includes:
   (a) a flapper valve having an open position opening said liquid inlet opening and a closed position closing said liquid inlet opening; and
   (b) a counter-weight for biasing said flapper valve towards its closed position.

7. The invention of claim 1 wherein said gas outlet opening includes pilot for opening same in response to gas pressure within said tank.

8. The invention of claim 1 wherein said liquid dispensing means comprises a spray boom assembly with multiple discharge orifices.

9. The invention of claim 8 wherein said spray boom assembly includes a pair of spray boom wing sections each mounted on a respective end of a spray boom center section with each said wing section being pivotable with respect to the center section between transport and extended positions, each said spray boom wing section being fluidically connected to said spray boom center section.

10. The invention of claim 1 wherein said liquid dispensing means comprises a front mounted side discharge spray head and associated valve for cleaning curbs.

11. A water truck with a pressurized liquid supply system, comprising:
   (a) an internal combustion engine of said truck, said engine including an exhaust gas outlet;
   (b) a tank mounted on said truck, said tank including a tank interior;
   (c) gas pressure communicating means fluidically connecting said exhaust gas outlet to a gas pressure inlet in said tank, said gas pressure inlet communicating directly with said tank interior, said gas pressure communicating means including a diverter valve which connects said exhaust gas outlet with said tank in a first position and diverts said exhaust gas from said tank in a second position;

(d) a liquid inlet opening in said tank, said liquid inlet opening including a check valve positioned within said tank communicating directly with said tank interior for admitting liquid to said tank but for blocking pressurized gas discharge therefrom through said liquid inlet opening when no liquid is being admitted;

(e) a liquid outlet opening in said tank communicating directly with said tank interior, said liquid outlet opening being positioned in a top portion of said tank;

(f) outlet valve means fluidically communicating with said tank outlet opening;

(g) liquid dispensing means fluidically connected to said outlet valve means;

(h) pressure regulator means for maintaining a predetermined gas pressure in said tank; and (i) a pipe extending through said liquid outlet opening in said tank, said pipe extending into said tank and with an open end located proximate a bottom surface of said tank and a second end connecting with said outlet valve means.

12. The invention of claim 11 wherein:

(a) said diverter valve comprises a three-way valve with an inlet fluidically connected to said exhaust gas outlet, a pressure outlet fluidically connected to said tank gas inlet opening and an exhaust outlet fluidically connected to an exhaust gas discharge, said diverter valve communicating said inlet and said pressure outlet in its first position and communicating said inlet and said exhaust outlet in its second position.

13. The invention of claim 12 wherein said gas outlet opening includes a pressure relief valve for opening same in response to gas pressure within said tank.

14. The invention of claim 12 wherein said liquid dispensing means comprises a spray boom assembly with multiple discharge orifices.

15. The invention of claim 14 wherein said spray boom assembly includes a pair of spray boom wing sections each mounted on a respective end of a spray boom center section with each said wing section being pivotable with respect to the center section between transport and extended positions, each said spray boom wing section being fluidically connected to said spray boom center section.

16. The invention of claim 11 wherein said check valve includes:

(a) a flapper valve having an open position opening said liquid inlet opening and a closed position closing said liquid inlet opening; and (b) a counter-weight for biasing said flapper valve towards its closed position.

17. The invention of claim 11 wherein said liquid dispensing means comprises a front mounted side discharge spray head and associated valve for cleaning curbs.

18. A method of dispensing liquid from a tank mounted on a water truck provided with an internal combustion engine, said method comprising the steps of:

(a) selectively introducing exhaust gas from said engine to said tank to thereby pressurize said tank;

(b) discharging water under pressure from said tank via a pipe which extends from an upper end positioned near the bottom of said tank upward to and through a liquid outlet opening positioned in a top portion of said tank;

(c) opening a liquid discharge valve which fluidically communicates with said pipe to thereby discharge liquid under pressure from said tank; and (d) distributing liquid discharged under pressure from said tank via a spray bar communicating with said valve and extending across a path of movement of said water truck.

19. A pressurized liquid supply system, comprising:

(a) a truck driven by an internal combustion engine, said engine including an exhaust gas outlet;

(b) a tank mounted on said truck, said tank including a tank interior;

(c) gas pressure communicating means fluidically connecting said exhaust gas outlet to a gas pressure inlet in said tank, said gas pressure inlet communicating directly with said tank interior;

(d) a liquid inlet opening in said tank communicating directly with said tank interior;

(e) a liquid outlet opening in said tank communicating directly with said tank interior;

(f) outlet valve means fluidically communicating with said tank outlet opening;

(g) liquid dispensing means fluidically connected to said outlet valve means;

(h) said liquid dispensing means being automatically controlled by the communication of exhaust gas pressure from said engine to said tank interior;

(i) a pipe extending through said liquid outlet opening in said tank, said pipe extending into said tank and with an open end located proximate a bottom surface of said tank and a second end connecting with said outlet valve means; and (j) an anti-siphon orifice extending through a wall of said pipe within said tank.

20. A water truck with a pressurized liquid supply system, comprising:

(a) an internal combustion engine of said truck, said engine including an exhaust gas outlet;

(b) a tank mounted on said truck, said tank including a tank interior;

(c) gas pressure communicating means fluidically connecting said exhaust gas outlet to a gas pressure inlet in said tank, said gas pressure inlet communicating directly with said tank interior, said gas pressure communicating means including a diverter valve which connects said exhaust gas outlet with said tank in a first position and diverts said exhaust gas from said tank in a second position;

(d) a liquid inlet opening in said tank, said liquid inlet opening including a check valve positioned within said tank communicating directly with said tank interior for admitting liquid to said tank but for blocking pressurized gas discharge therefrom through said liquid inlet opening when no liquid is being admitted;

(e) a liquid outlet opening in said tank communicating directly with said tank interior;

(f) outlet valve means fluidically communicating with said tank outlet opening;

(g) liquid dispensing means fluidically connected to said outlet valve means;

(h) pressure regulator means for maintaining a predetermined gas pressure in said tank;

(i) said liquid dispensing means being automatically controlled by the communication of exhaust gas pressure from said engine to said tank interior;

(j) a pipe extending through said liquid outlet opening in said tank, said pipe extending into said tank with an open end located proximate a bottom surface of said tank and a second end connecting with said outlet valve means; and (k) an anti-siphon orifice extending through a wall of said pipe within said tank.

21. A pressurized liquid supply system, comprising:

(a) a truck driven by an internal combustion engine, said engine including an exhaust gas outlet;

(b) a tank mounted on said truck, said tank including a tank interior;

(c) said tank excluding a first liquid inlet opening with a fill tube extending through said first liquid inlet opening and into said tank interior, said tube being adapted for connection to a source of water under pressure;

(d) gas pressure communicating means fluidically connecting said exhaust gas outlet to a gas pressure inlet in said tank, said gas pressure inlet communicating directly with said tank interior;

(e) a second liquid inlet opening in said tank communicating directly with said tank interior, said second liquid inlet opening having an interior and an exterior opening and being positioned on top of said tank in a position to receive liquid from an elevated water source positioned above said tank;

(f) a flapper valve positioned within said tank, said flapper valve being movable between an upper position in which it seals off the interior opening of said second liquid inlet opening and a lower position in which it unseals the interior opening of said second liquid inlet opening, said flapper valve being automatically movable from said upper to said lower position by the weight of water from said elevated water source;

(g) a counterweight connected to said flapper valve to urge said flapper valve toward said upper position; and (h) an exterior cap positioned outside of said tank for selectively closing off said exterior opening of said second liquid inlet opening;

(i) a liquid outlet opening in said tank communicating directly with said tank interior;

(j) outlet valve means fluidically communicating with said liquid outlet opening; and (k) liquid dispensing means fluidically connected to said outlet valve means.

\* \* \* \* \*